(12) United States Patent
Lee et al.

(10) Patent No.: US 11,150,499 B2
(45) Date of Patent: Oct. 19, 2021

(54) PANEL REPAIRING APPARATUS AND METHOD OF REPAIRING DISPLAY PANEL USING THE SAME

(71) Applicant: Samsung Display Co., LTD., Yongin-si (KR)

(72) Inventors: Sang Keun Lee, Yongin-si (KR); Bum Hwan Park, Yongin-si (KR); Hyuk Son, Yongin-si (KR); Kyu Wook Choi, Yongin-si (KR); Jong Gyu Park, Yongin-si (KR); Jae Young Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 24 days.

(21) Appl. No.: 16/836,289

(22) Filed: Mar. 31, 2020

(65) Prior Publication Data

US 2021/0026169 A1 Jan. 28, 2021

(30) Foreign Application Priority Data

Jul. 23, 2019 (KR) .......... 10-2019-0089116

(51) Int. Cl.
*G02F 1/13* (2006.01)
*G02F 1/1339* (2006.01)

(52) U.S. Cl.
CPC ........ *G02F 1/1309* (2013.01); *G02F 1/13394* (2013.01); *G02F 1/13396* (2021.01)

(58) Field of Classification Search
CPC ......... G02F 1/1309; G02F 2001/13396; G02F 1/13394
See application file for complete search history.

(56) References Cited

U.S. PATENT DOCUMENTS

| 7,502,094 B2 | 3/2009 | Son | |
| 2007/0296907 A1* | 12/2007 | Eun | ........ G02F 1/1341 349/153 |
| 2018/0343386 A1 | 11/2018 | Kim et al. | |

FOREIGN PATENT DOCUMENTS

| KR | 10-0477131 | 7/2005 |
| KR | 10-2008-0060701 | 7/2008 |
| KR | 10-1133765 | 4/2012 |
| KR | 10-1789144 | 11/2017 |
| KR | 10-2018-0128552 | 12/2018 |

* cited by examiner

*Primary Examiner* — Joseph L Williams
(74) *Attorney, Agent, or Firm* — Kile Park Reed & Houtteman PLLC

(57) ABSTRACT

A panel repairing apparatus and a method of repairing a display panel using the same are disclosed. The panel repairing apparatus includes a panel loader for accommodating a display panel therein, a laser repair unit for repairing the display panel by irradiating laser onto the display panel, and a press repair unit for repairing the display panel by pressurizing the display panel.

20 Claims, 10 Drawing Sheets

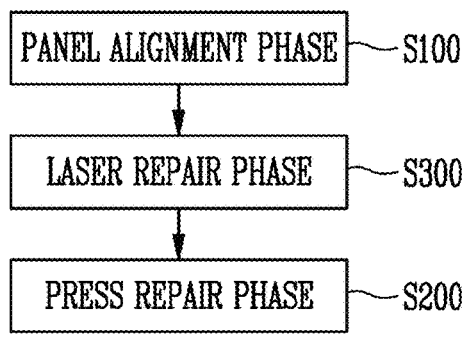
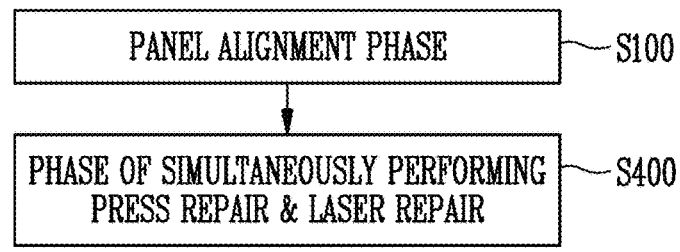
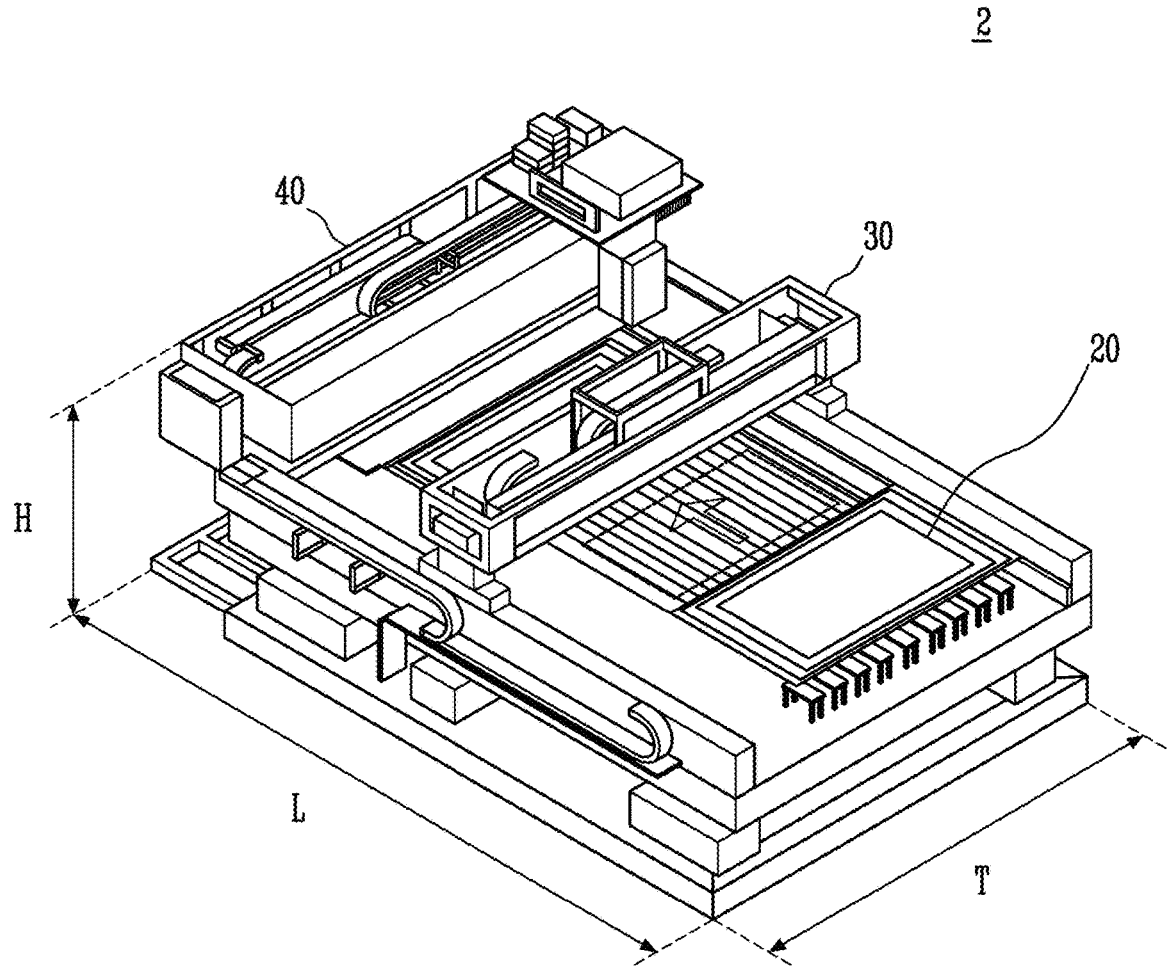

PANEL REPAIRING APPARATUS AND METHOD OF REPAIRING DISPLAY PANEL USING THE SAME

CROSS-REFERENCE TO RELATED APPLICATION(S)

This application claims priority to and benefits of Korean Patent Application No. 10-2019-0089116 under 35 U.S.C. § 119(a), filed on Jul. 23, 2019, in the Korean Intellectual Property Office, the entire disclosure of which is incorporated herein by reference.

BACKGROUND

1. Technical Field

The disclosure relates to a panel repairing apparatus and a method of repairing a display panel, using the same.

2. Description of the Related Art

A display panel, for example, a liquid crystal display panel, may have a structure in which a pair of substrates are disposed to face each other with a cell gap with interposed therebetween, and a liquid crystal layer occupies the cell gap.

The cell gap is necessitated to be uniform in at least an area in which an image is displayed. Accordingly, column spacers having a predetermined height between the pair of substrates are used for uniformly maintaining the cell gap.

Non-uniformity of the cell gap may be caused by the column spacers having different heights or by a foreign substance penetrating into the cell gap during the manufacturing process of the display panel. When the cell gap is not uniform, the alignment of liquid crystals may be in disorder in liquid crystal display devices. As a result, luminance non-uniformity, color shading, or the like may be exhibited.

SUMMARY

Embodiments of the invention provide a panel repairing apparatus having a repair unit using application of laser and a repair unit using application of pressure on a display panel.

Other embodiments of the invention also provide a method of repairing a display panel, using the panel repairing apparatus.

In accordance with an aspect of the disclosure, there is provided a panel repairing apparatus including: a panel loader that accommodates a display panel therein; a laser repair unit that repairs the display panel by irradiating a laser onto the display panel; and a press repair unit that repairs the display panel by pressurizing the display panel.

The press repair unit may include: a repair determiner obtains images of a surface of the display panel; and a pressurizer that pressurizes the surface of the display panel.

The pressurizer may include a pressurizing part having a cylindrical shape, the pressurizing part including a planar surface that pressurizes the display panel.

The repair determiner may be provided in the form of a movable camera.

The repair determiner may automatically determine a visible failure of the display panel.

The laser repair unit and the press repair unit may include a moving member that is movable in the X-axis, Y-axis, and Z-axis directions.

The laser repair unit and the press repair unit may be disposed in one gantry structure.

The panel repairing apparatus may have a width of about 3,500 mm or less, a length of about 5,400 mm or less, and a height of about 3,340 mm or less.

The panel repairing apparatus may further comprise a controller that controls the panel loader, the laser repair unit, and the press repair unit.

The controller may collect defect position information of the display panel.

The laser repair unit may perform carbonization processing or light-blocking processing in the display panel.

The panel loader may move a position of the display panel, wherein the press repair unit or the laser repair unit has access to a defect position of the display panel.

In accordance with another aspect of the disclosure, there is provided a method of repairing a display panel, the method including: accommodating the display panel in a panel loader; pressurizing a surface of the display panel; and irradiating a laser onto the display panel.

The pressurizing the surface of the display panel and the irradiating the laser may be performed at a same time.

The display panel may include at least two transparent insulating substrates facing each other and column spacers disposed between the at least two transparent insulating substrates.

The column spacers may include a first column spacer and a second column spacer, which have different heights.

The pressurizing of the surface of the display panel may be maintained for a predetermined time.

Images of the surface of the display panel may be obtained before and after the pressurizing of the surface of the display panel.

The obtaining of images of the surface of the display panel may include photographing the surface of the display panel.

In accordance with still another aspect of the disclosure, there is provided a panel repairing apparatus for repairing a display panel by pressurizing the display panel, the panel repairing apparatus comprising: a repair determiner that obtains images of a surface of the display panel to determine a repair status of the display panel; and a pressurizer that pressurizes the surface of the display panel.

BRIEF DESCRIPTION OF THE DRAWINGS

Embodiments will now be described in detail with references to the accompanying drawings. However, the invention is not limited to the embodiments described in the specification. Other embodiments and/or modifications may be made by one of ordinary skill in the art without departing from the spirit and scope of the disclosure.

In the drawing figures, dimensions may be exaggerated for clarity of illustration. It will be understood that when an element is referred to as being "between" two elements, it can be the only element between the two elements, or one or more intervening elements may also be present. Reference numerals refer to the same elements throughout this disclosure.

FIGS. 13 and 14 are flowcharts for explaining methods of repairing a display panel in accordance with other embodiments.

FIG. 15 is a view illustrating a panel repairing apparatus in accordance with another embodiment.

DETAILED DESCRIPTION OF THE EMBODIMENTS

Figure 1:
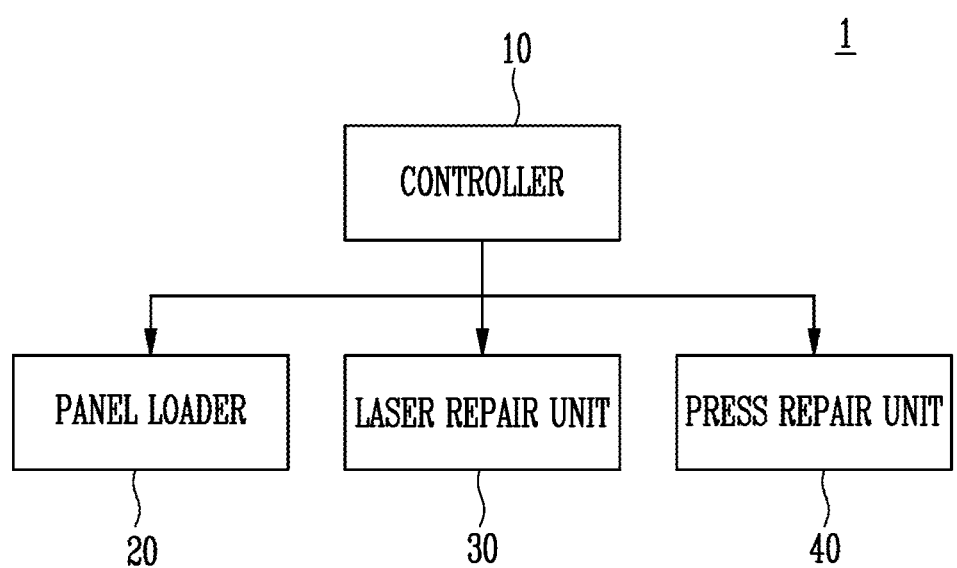
FIG. 1 is a block diagram schematically illustrating a panel repairing apparatus in accordance with an embodiment.

The characteristics of the present disclosure and a method of achieving those characteristics will be clear by referring to the embodiments described below in detail together with the drawings. However, the disclosure is not limited to the embodiments disclosed herein but may be implemented in various forms. The embodiments are provided by way of example only so that a person of ordinary skill in the art can fully understand the features in the disclosure and the scope thereof. Therefore, the disclosure can be defined by the scope of the claims.

When a layer, film, region, substrate, or area, is referred to as being "on" another layer, film, region, substrate, or area, it may be directly on the other film, region, substrate, or area. Alternatively, intervening films, regions, substrates, or areas may be present therebetween. Conversely, when a layer, film, region, substrate, or area, is referred to as being "directly on" another layer, film, region, substrate, or area, then intervening layers, films, regions, substrates, or areas, may be absent therebetween. Furthermore, when a layer, film, region, substrate, or area, is referred to as being "below" another layer, film, region, substrate, or area, it may be directly below the other layer, film, region, substrate, or area. Alternatively, intervening layers, films, regions, substrates, or areas, may be present therebetween. Conversely, when a layer, film, region, substrate, or area, is referred to as being "directly below" another layer, film, region, substrate, or area, then intervening layers, films, regions, substrates, or areas, may be absent therebetween. Further, "over" or "on" may include positioning on or below an object and does not necessarily imply a direction based upon gravity. In the entire description of the disclosure, the same drawing reference numerals are used for the same elements across various figures.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

Hereinafter, embodiments will be described with reference to the accompanying drawings.

Figure 2:
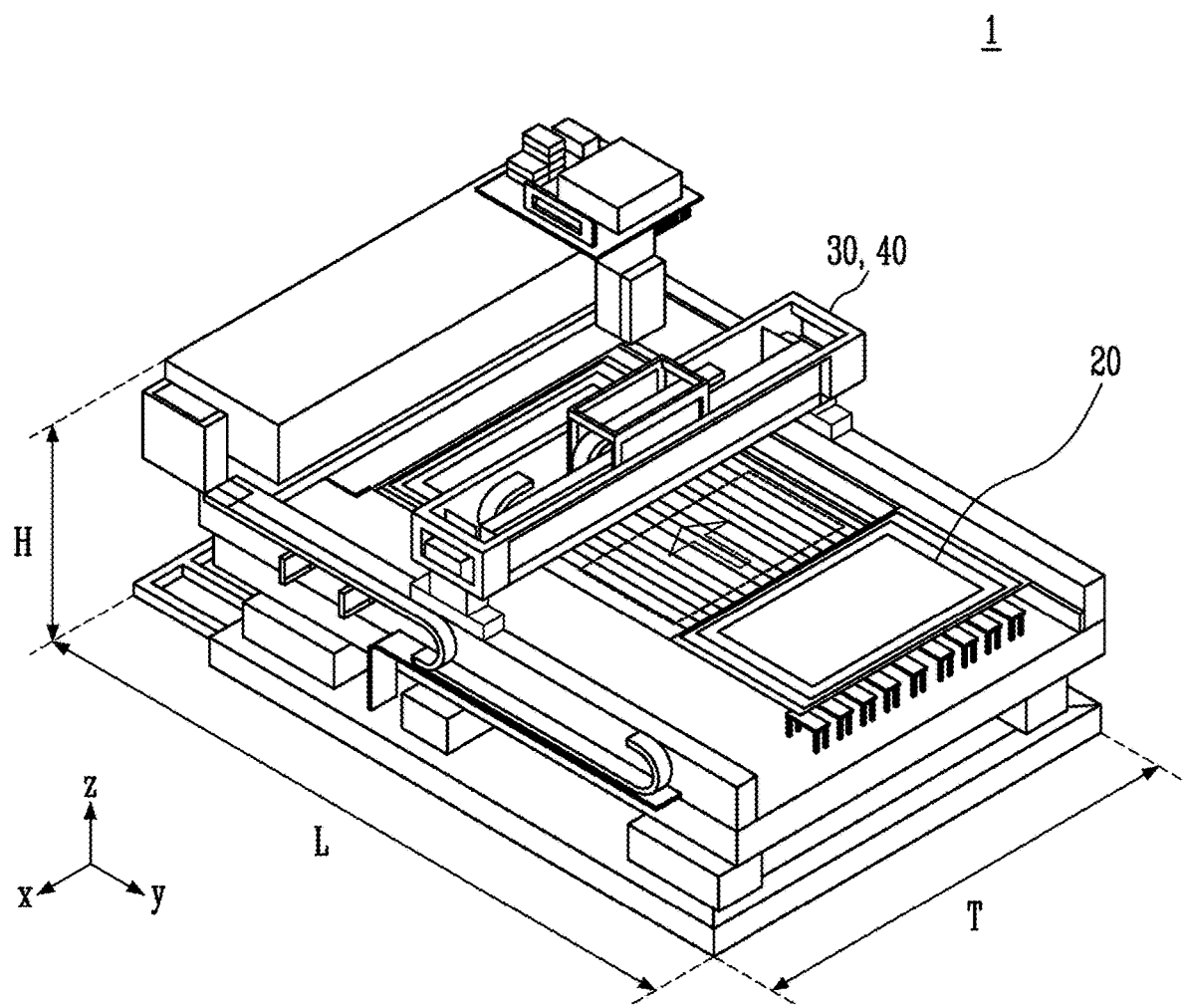
FIG. 2 is a perspective view illustrating the panel repairing apparatus in accordance with an embodiment.
Figure 3:
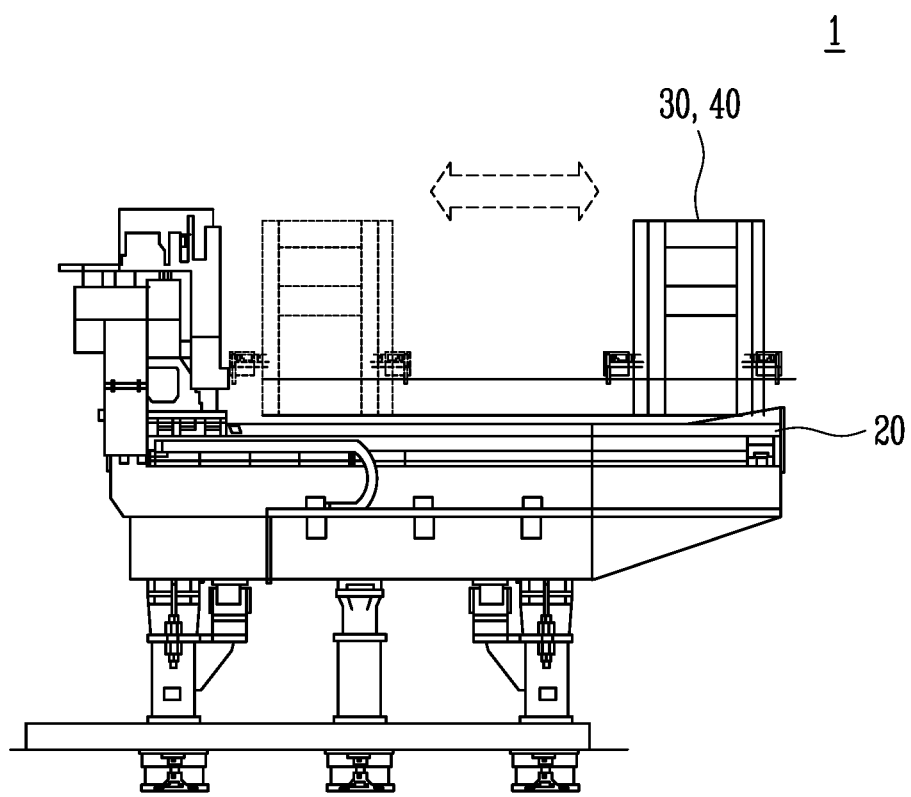
FIG. 3 is a side view illustrating the panel repairing apparatus in accordance with an embodiment.
Figure 4:
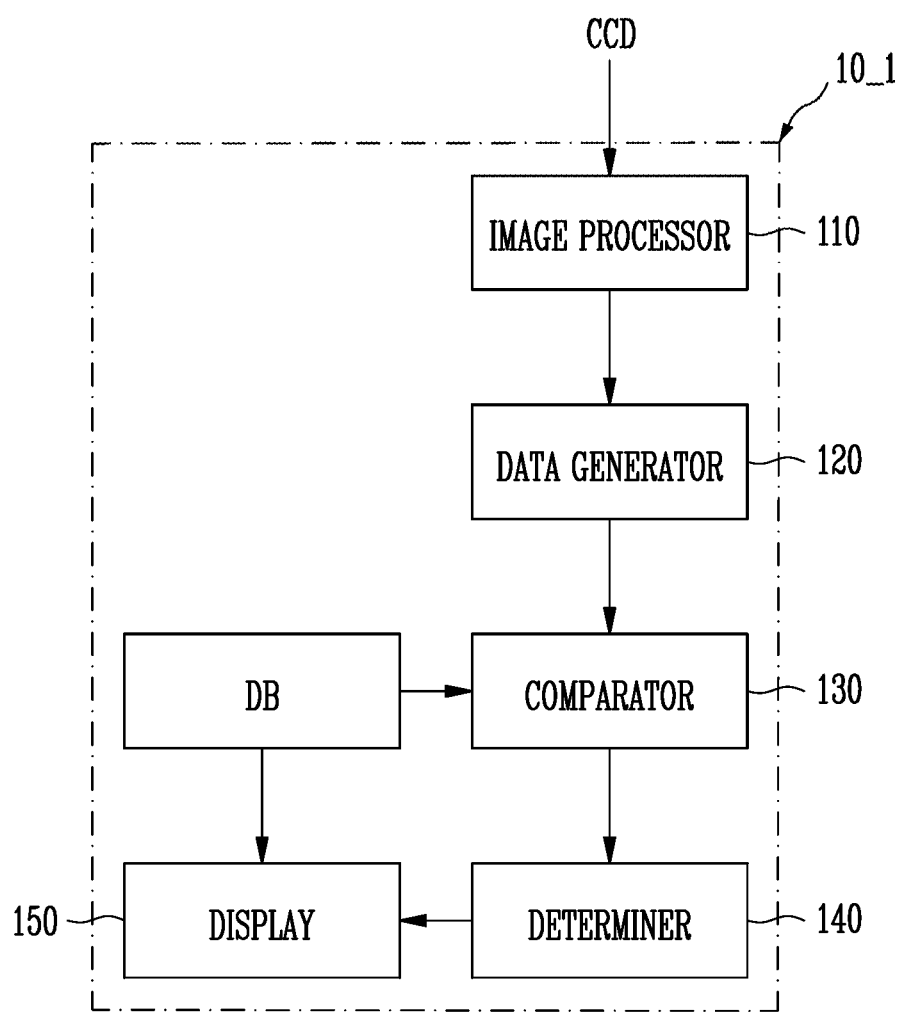
FIG. 4 is a block diagram illustrating a modification of a controller shown in FIG. 1.

FIG. 1 is a block diagram schematically illustrating a panel repairing apparatus in accordance with an embodiment. FIG. 2 is a perspective view illustrating the panel repairing apparatus in accordance with the embodiment. FIG. 3 is a side view illustrating the panel repairing apparatus in accordance with the embodiment. FIG. 4 is a block diagram illustrating a modification of a controller shown in FIG. 1.

Referring to FIGS. 1 to 3, the panel repairing apparatus 1 may repair a display panel. Hereinafter, a case where the display panel is a liquid crystal display panel will be described as an example. However, the display panel may be in the form of other devices, such as an organic light emitting display panel, a quantum dot display panel, or a micro LED display panel.

The panel repairing apparatus 1 may include a controller 10, a panel loader 20, a laser repair unit 30, and a press repair unit 40, for which operations are controlled by the controller 10.

The controller 10 may collect defect position information of the display panel. In an embodiment, before the display panel is repaired by the panel repairing apparatus 1, a defect of the display panel and a defect position of the display panel may be inspected with the naked eye at the outside of the panel repairing apparatus 1 or by obtaining image(s), for example, photographing by an image pickup apparatus.

The defect of the display panel may be determined according to whether the display panel has dark brightness falling short of a reference luminance value or bright brightness exceeding the reference luminance value when a normal reference signal is applied to the display panel. In addition, a corresponding position having the dark brightness falling short of the reference luminance value or the bright brightness exceeding the reference luminance value may be determined as the defect position.

In an embodiment, the controller 10 may collect defect position information from the outside. For example, the controller 10 may collect the defect position information external to the display panel in a manner that a user of the panel repairing apparatus 1 inputs the defect position information of the display panel to the controller 10.

The panel repairing apparatus 1 may also be configured to autonomously determine a defect of the display panel and the position of the defect.

For example, the panel repairing apparatus 1 may autonomously inspect a defect of the display panel and the position of defect, wherein the panel repairing apparatus 1 may automatically collect display panel defect information and the defect position information. Referring to FIG. 4, a controller 10_1 may include an image processor 110 for processing an image input from a camera, a data generator 120 for generating data, based on a result obtained by processing the image in the image processor 110, a comparator 130 for comparing the data generated by the data generator 120 with data stored in a database DB, a determiner 140 for determining a repair result, based on the comparison result of the comparator 130, and a display 150 for notifying a worker of the data stored in the database DB, measured data of an actual repair area, and the like by displaying the data stored in the database DB, the measured data of the actual repair area, and the like, based on the determine repair result.

A three-dimensional image from the camera (for example, a charge-coupled device camera) is input to the image processor 110. The three-dimensional image represents various shapes such as the widths of lower and upper portions of a processed part and the width and height of a ripple occurring in a processed area, in addition to the width, depth, or height of a repaired part. In the image processor 110, the input image may be processed by software such as an image processing algorithm.

The data generator 120 may generate data, based on a result processed in the image processor 110. For example, the widths, depths, or heights of the upper and lower portions of the repaired part, the width and height of the ripple, the uniformity of repaired areas, and the like may be generated using specific numerical values.

The comparator 130 compares the data generated by the data generator 120 with the data stored in the database DB. Allowable range data of repair may be stored in the database DB. For example, height and width ranges of the repair, width and height ranges of the ripple, and a range of the uniformity of the repaired area, in which a liquid crystal display device is determined as a good product when an examination is performed after the repair.

The determiner 140 may determine a result of the repair, based on the comparison result of the comparator 130. For example, when the widths of the upper and lower portions of the repaired part, which are generated by the data generator 120, are within an allowable range stored in the database DB, the determiner 140 determines that the repair has been successfully performed. When the widths of the upper and lower portions of the repaired part are not within the allowable range stored in the database DB, the determiner 140 determines the repair as a failure.

Similarly, when the height or depth of the repaired part, which is generated by the data generator 120, is within an allowable range stored in the database DB, the determiner 140 determine that the repair has been successfully performed. When the height (or depth) of the repaired part is not within the allowable range stored in the database DB, the determiner 140 determines the repair as a failure.

This determination process may be applied to the width and height of the ripple, the uniformity of the repaired areas, and the like. Finally, the determiner 140 determines that the repair has succeeded only when all measured data of the repaired display panel satisfies the criteria for repair and determines that the repair has failed even when one part of the measured data does not satisfy the criteria for repair. However, these criteria may be changed, if necessary. For example, the reference where the repair succeeds may be changed depending on the kind of repair, and hence the determiner 140 may determine that the repair has succeeded even when all the references are not satisfied.

Referring again to FIGS. 1 to 3, the controller 10 may control the panel loader 20, the laser repair unit 30, and the press repair unit 40, based on the collected defect of the display panel and the collected defect position of the display panel.

The panel loader 20 may accommodate the display panel as an object to be repaired. In an embodiment, the panel loader 20 may be disposed on a repair stage. The panel loader 20 may move while accommodating the display panel therein so as to repair the entire area of the display panel. The panel loader 20 may move in the X-axis, the Y-axis, and the Z-axis directions. In an embodiment, the display panel may be cut in a cell unit configured as one display device to be accommodated in the panel loader 20.

The laser repair unit 30 and the press repair unit 40 may be configured in a ruler-shaped gantry structure that is provided with a moving member such as a lead frame, which can move in the X-axis, the Y-axis, and the Z-axis directions on the panel loader 20, and has an empty lower portion such that the display panel accommodated in the panel loader 20 is located at the lower portion. Accordingly, the laser repair unit 30 and the press repair unit 40 move to search for the input defect position while laterally moving above the display panel accommodated in the panel loader 20.

A guide rail for providing a path along which the laser repair unit 30 and the press repair unit 40 can laterally move may be provided at an upper portion or side surface of the panel loader 20. Accordingly, the controller 10 controls the laser repair unit 30 and the press repair unit 40 to be located vertically above the defect position while laterally moving on the display panel.

In an embodiment, the laser repair unit 30 and the press repair unit 40 may be formed in one gantry structure. Each of the laser repair unit 30 and the press repair unit 40 may independently move in the X-axis, the Y-axis, and the Z-axis directions on the panel loader 20 in the one gantry structure. However, in another embodiment, the panel repairing apparatus 1 may be formed such that each of the laser repair unit 30 and the press repair unit 40 has an independent gantry structure.

In an embodiment, the laser repair unit 30 and the press repair unit 40 may be disposed in one gantry structure such that the panel repairing apparatus 1 has a width T in the X-axis direction of about 3,500 mm or less, a length L in the Y-axis direction of about 5,400 mm or less, and a height H in the Z-axis direction of about 3,340 mm or less. The panel repairing apparatus 1 of this embodiment can improve efficiency of a space, repair time, efficiency of cost, and the like, as compared with a case where a laser repairing apparatus and a press repairing apparatus are separately provided to repair a display panel.

The press repair unit 40 will be described in detail in conjunction with FIGS. 5 to 7B.

Figure 5:
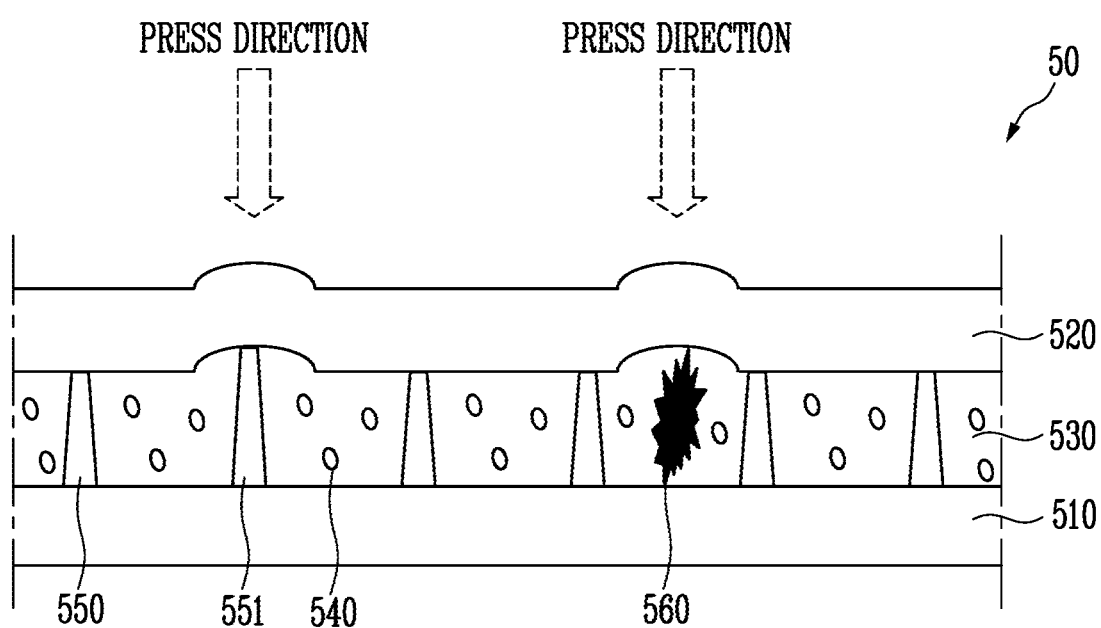
FIG. 5 is a schematic view of an exemplary illustration of a section of a display panel determined as failure.
Figure 6:
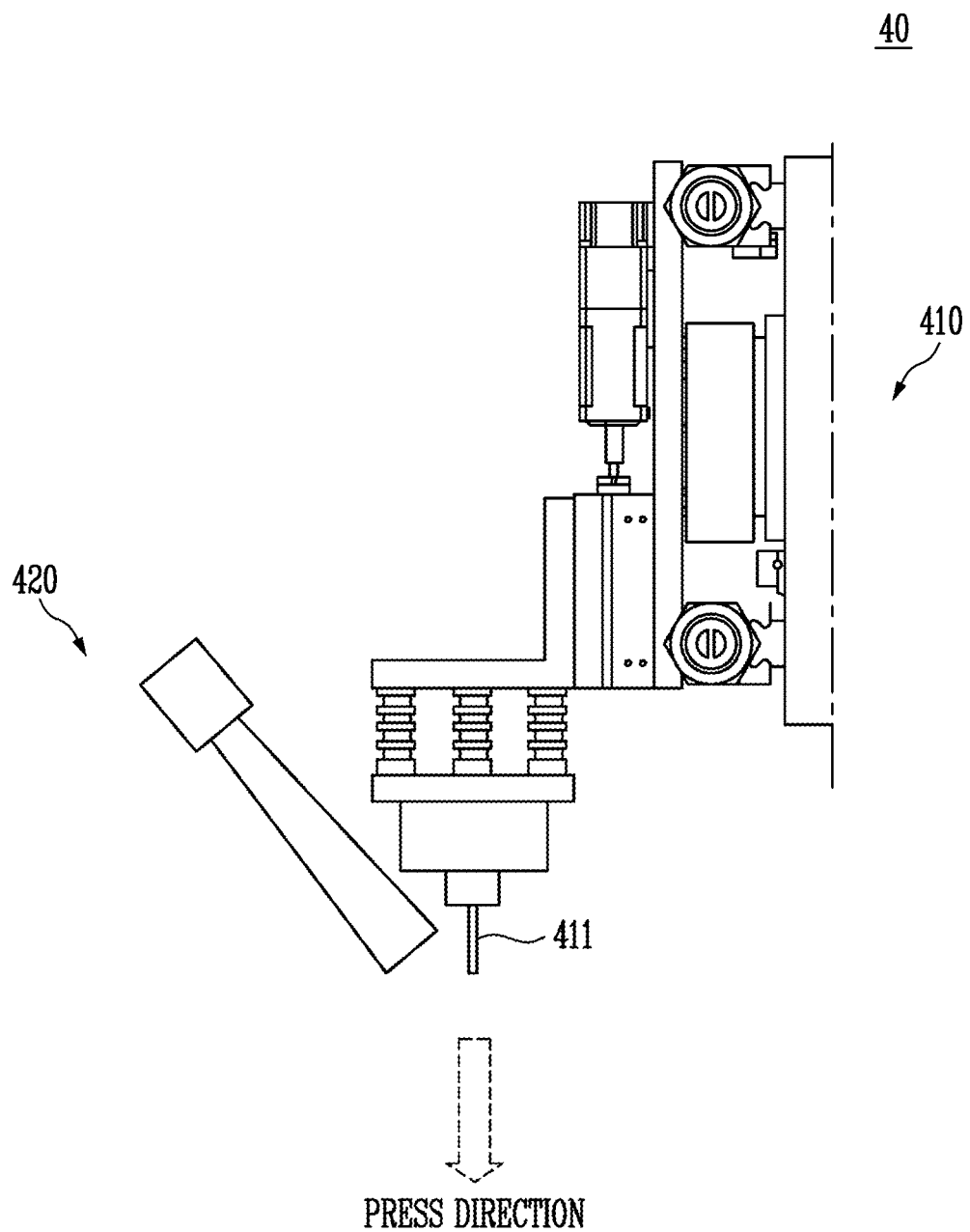
FIG. 6 is a side view of a press repair unit in accordance with an embodiment.
Figure 7A:
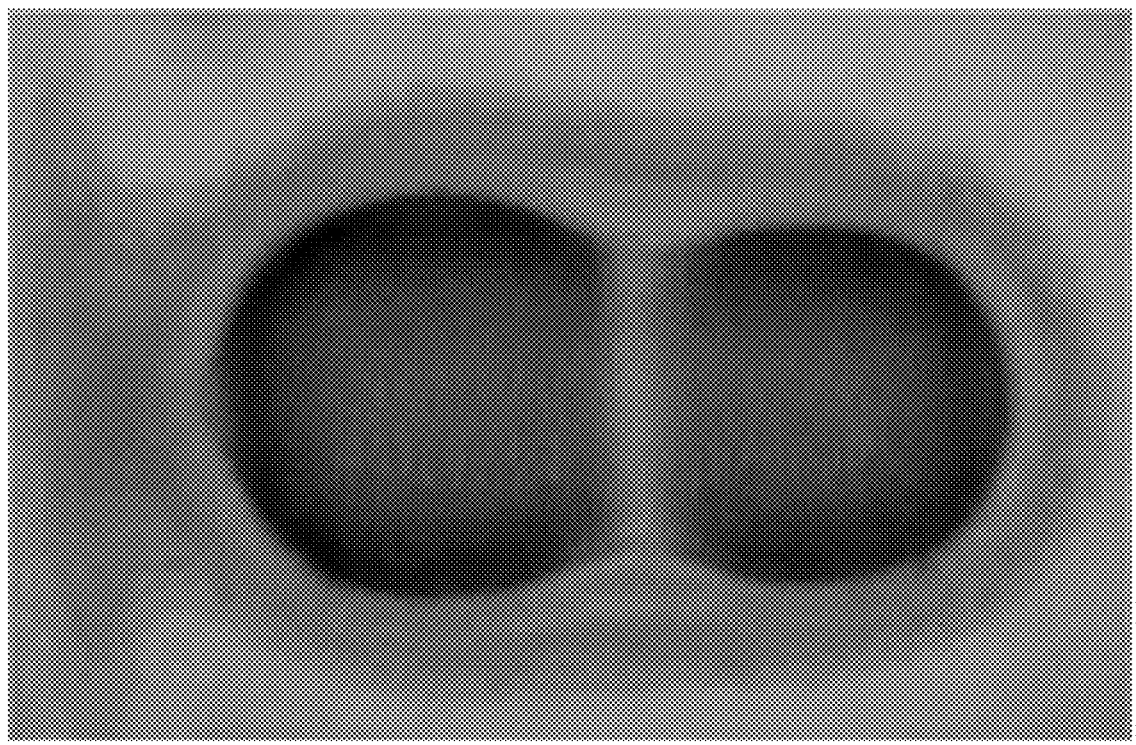
FIG. 7A is an image of a partial surface of a display panel determined as a failure.
Figure 7B:
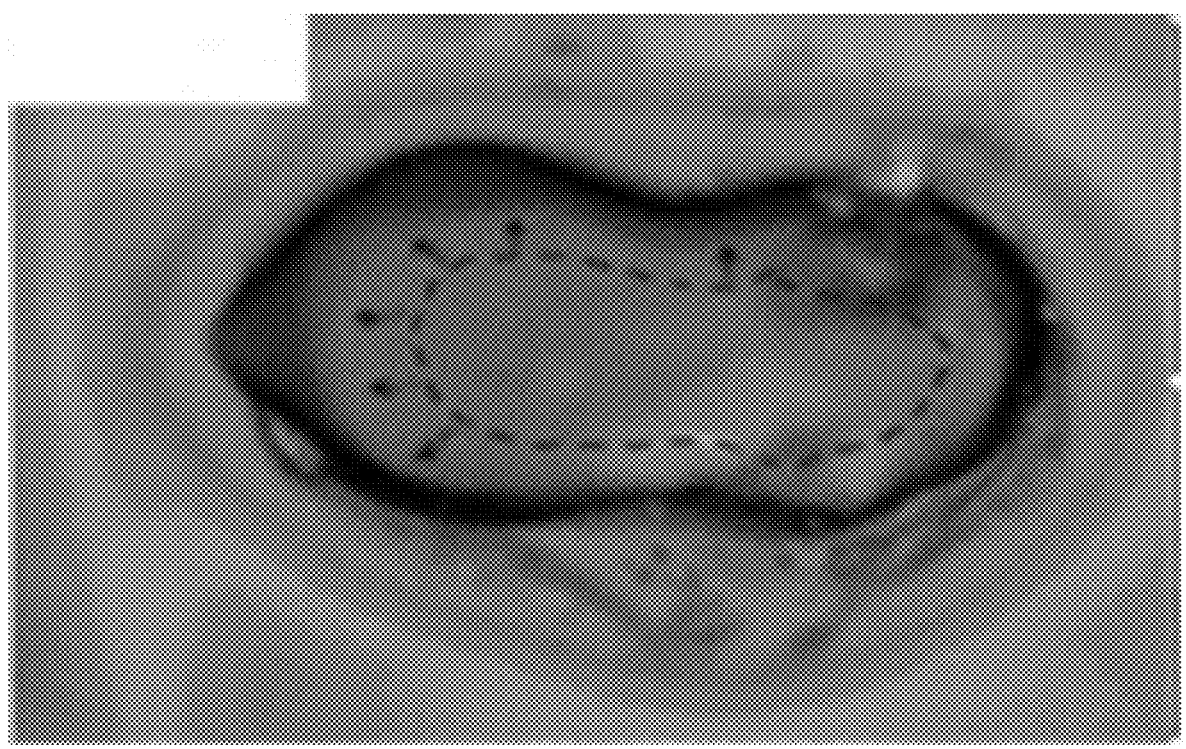
FIG. 7B is an image of a partial surface of a display panel repaired by the press repair unit.

FIG. 5 is a schematic view illustrating a section of a display panel determined as failure. FIG. 6 is a side view of the press repair unit in accordance with an embodiment. FIG. 7A is an image of a partial surface of a display panel determined as a failure. FIG. 7B is an image of a partial surface of a display panel repaired by the press repair unit.

Referring to FIG. 5, the display panel 50 may be a liquid crystal display panel, and may include a first display plate 510 and second display plate 520, which face each other, and a liquid crystal layer 530.

The first display plate 510 may include a first transparent insulating substrate, a TFT circuit layer disposed on the first transparent insulating substrate, and a first pixel electrode disposed on the TFT circuit layer.

The first transparent insulating substrate may include a glass material, a quartz material, or a transmissive plastic material. The first transparent insulating substrate may be a flexible substrate or have a form in which films or layers are stacked.

The TFT circuit layer may include a conductive layer, a semiconductor layer, and an insulating layer, which constitute thin film transistors and storage capacitors.

The conductive layer may be formed as a single layer made of at least one selected from, a double layer made of at least two selected from, or a triple layer made of at least three selected from conductive metals including aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi).

The semiconductor layer may be formed of amorphous silicon, polycrystalline silicon, etc. In another embodiment, the semiconductor layer may include an oxide semiconductor. When the semiconductor layer includes the oxide semiconductor, the semiconductor layer may be formed of one selected from oxide semiconductors including In—Ga—Zinc-Oxide (IGZO), ZnO, ZnO2, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

The insulating layer insulates the conductive layer and the semiconductor layer from each other between the conductive layer and the semiconductor layer, and may be formed of silicon nitride, silicon oxide, or the like. The insulating layer may have a multi-layered structure including at least two insulating layers having different physical properties.

The first pixel electrode may include a transparent conductive material. The transparent conductive material may include polycrystalline, mono-crystalline or amorphous Indium Tin Oxide (ITO). In an embodiment, the first pixel electrode may be an anode.

In some embodiments, the first display plate 510 may further include a color filter disposed between the TFT circuit layer and the first pixel electrode.

The second display plate 520 may include a second transparent insulating substrate, a black matrix disposed on the second transparent insulating substrate, a planarization layer disposed on the black matrix, and a second pixel electrode disposed on the planarization layer.

The second transparent insulating substrate is disposed to face the first transparent insulating substrate. The second transparent insulating substrate may be formed of transparent glass, transparent plastic, or the like. In an embodiment, the second transparent insulating substrate may be formed of the same material as the first transparent insulating substrate.

The black matrix may distinguish pixels. The material of the black matrix is not particularly limited as long as it can block light. In an embodiment, the black matrix may be formed of a photosensitive compound, an organic material, a metallic material, or the like. In an embodiment, the photosensitive compound may include a binder resin, a polymeric monomer, a polymeric oligomer, a pigment, a dispersant, etc. The metallic material may include chromium.

The planarization layer may provide flatness to the second pixel electrode. The material of the planarization layer is not particularly limited. In an embodiment, the planarization layer may include an organic material or inorganic material.

At least a portion of the second pixel electrode may overlap with the first pixel electrode. In an embodiment, the second pixel electrode may be a common electrode. The second pixel electrode may be formed in a whole plate shape. However, the disclosure is not limited thereto, and the second pixel electrode may include slits. The second pixel electrode may be formed of a transparent conductive material such as ITO or IZO, a reflective metal such as aluminum, silver, chromium, or any alloy thereof.

The liquid crystal layer 530 includes liquid crystal molecules 540. In an embodiment, the liquid crystal molecules 540 may be vertically aligned in an initial alignment state while having a negative dielectric anisotropy. The liquid crystal molecules 540 may have a predetermined pretilt angle in the initial alignment state. The initial alignment of the liquid crystal molecules 540 may be induced by first and second alignment layers. When an electric field is formed between the first display plate 510 and the second display plate 520, the liquid crystal molecules 540 are inclined or rotated, so that the polarization state of light transmitted through the liquid crystal layer 530 can be changed.

Column spacers 550 and 551 may be disposed between the first display plate 510 and the second display plate 520, and maintain a cell gap such that the liquid crystal layer 530 can be disposed. Although not shown in FIG. 5, the column spacers 550 and 551 may overlap with the black matrix. The column spacers 550 and 551 may include a photosensitive material, and be formed through a general photoresist process.

Meanwhile, the display panel 50 determined as a failure may include the column spacers 550 and 551 having different heights. For example, a second column spacer 551 may be formed higher than a first column spacer 550 having a normal height.

Alternatively, in the case of the display panel 50 determined as a failure, a foreign substance 560 having a height greater than that of the first column spacer 550 penetrates into the cell gap, and therefore, the cell gap of the display panel 50 may be enlarged.

The second column spacer 551 or the foreign substance 560 interferes with the alignment of adjacent liquid crystal molecules 540, and allows the liquid crystal layer 530 to have a thickness different from that of surroundings. Therefore, a failure in luminance of the display panel 50 may have occurred.

The press repair unit 40 may specify a position at which the second column spacer 551 is formed or a position at which the foreign substance 560 penetrates into the cell gap, and then pressurizes the position. Thus, the second column spacer 551 or the foreign substance 560 is destroyed or plastic-deformed, and accordingly, the non-uniformity of the cell gap can be resolved.

In conjunction with FIG. 6, the press repair unit 40 may include a pressurizer 410 and an repair determiner 420.

The pressurizer 410 may destroy or plastic-deform the second column spacer 551 or the foreign substance 560 by pressurizing a surface of the display panel 50 (e.g., one surface of the second display plate 520) in a press direction. As described above, the pressurizer 410 may move in the X-axis, the Y-axis, and the Z-axis directions.

The pressurizer 410 may include a pressurizing part 411, a measurer for measuring and displaying a force applied to the pressurizing part with which the display panel 50 is pressurized. Various types of push-pull gauges known in the art may be applied to the pressurizer 410.

In an embodiment, the pressurizing part 411 may be a cylindrical member having a predetermined diameter, and be formed of a rigid material. The pressurizing part 411 may have, for example, a pin shape or a piston shape. A section of the pressurizing part 411, which pressurizes the display panel while being in contact with the display panel, may be formed almost planar.

In an embodiment, the repair determiner 420 may determine whether the display panel 50 is to be repaired by obtaining images of the surface of the display panel 50 before and after the pressurizer 410 pressurizes the display panel 50 to determine a repair status of the display panel 50. The repair determiner 420 may automatically determine a visible failure of the display panel 50. The images of the surface of the display panel 50 may be obtained by photographing the surface of the display panel 50.

The repair determiner 420 may be provided in the form of a movable camera. The repair determiner 420 may photograph the display panel 50 at an angle oblique to the surface of the display panel 50 or a spot vertical to the position at which the second column spacer 551 may be formed or the position at which the foreign substance 560 penetrates into the cell gap. The press repair unit 40 may include the repair determiner 420, so that the accuracy of repair can be improved.

The press repair unit 40 may be located on a position of the display panel 50, at which the second column spacer 551 or the foreign substance is detected. The pressurizing part 411 may pressurize the surface at the position of the display panel 50 with a predetermined pressure. Then, the pressurized state may be maintained for a predetermined time, thereby repairing the display panel 50. When the pressurized state with the predetermined pressure is continued for the predetermined time, the second column spacer 551 or the foreign substance may not return to the original numerical value and shape even when the pressurizing force is eliminated.

As shown in FIG. 7B, local non-uniformity of the cell gap can be resolved. Accordingly, luminance non-uniformity or color shading due to the non-uniformity of the cell gap is resolved, and hence a display panel that was conventionally handled as a defective product can be handled as a normal product.

The laser repair unit 30 will be described in detail in conjunction with FIGS. 8 to 10.

Figure 8A:
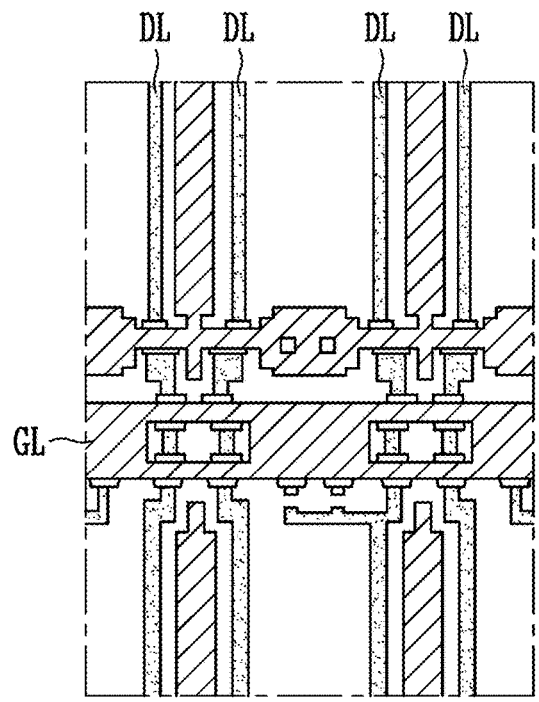
FIGS. 8A and 8B are layout views of a portion of a display panel, illustrating before and after a metal line is repaired by a laser repair unit in accordance with an embodiment.
Figure 8B:
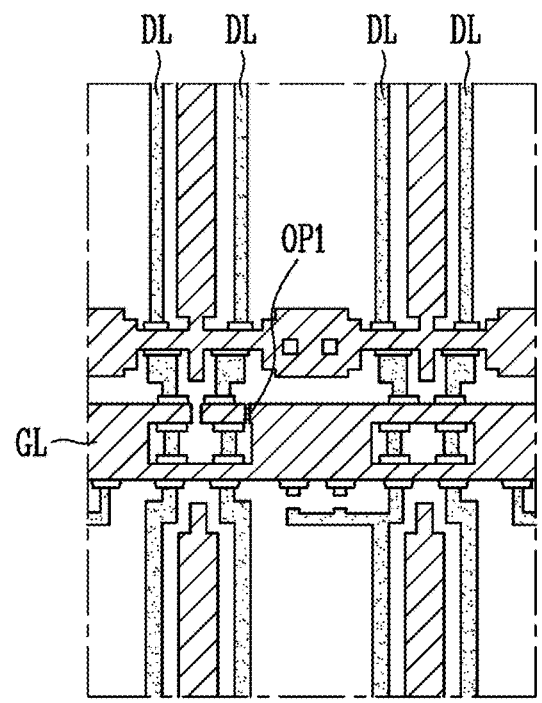
Figure 9A:
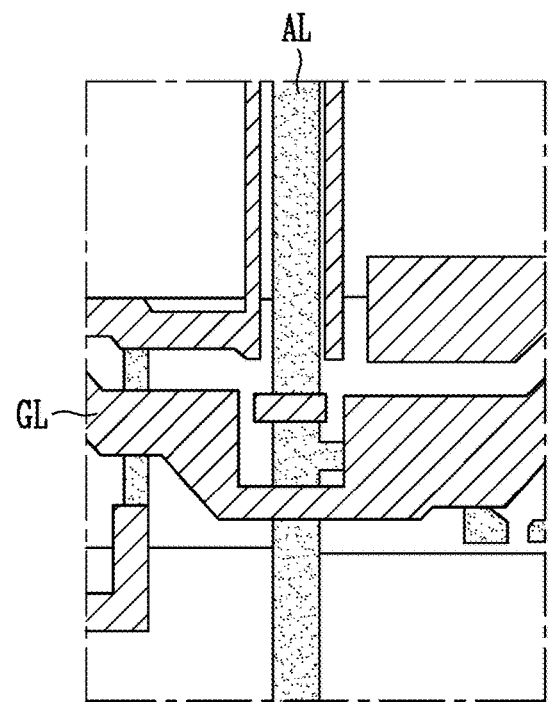
FIGS. 9A and 9B are layout views of a portion of the display panel, illustrating before and after a semiconductor pattern is repaired by the laser repair unit in accordance with an embodiment.
Figure 9B:
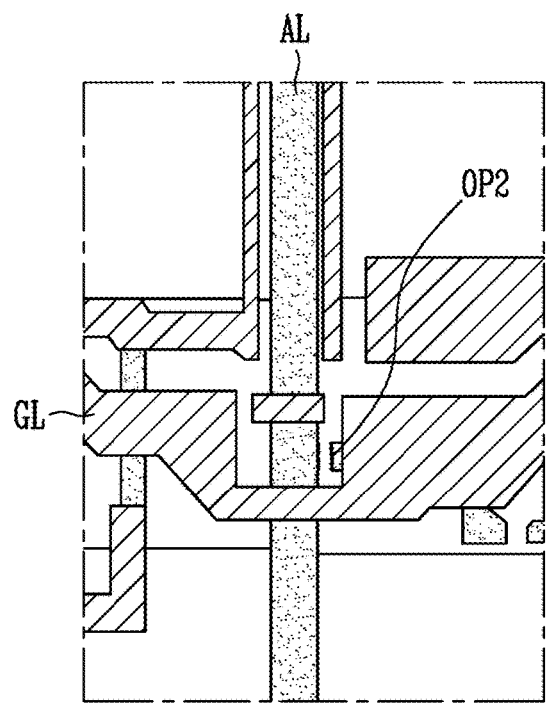
Figure 10A:
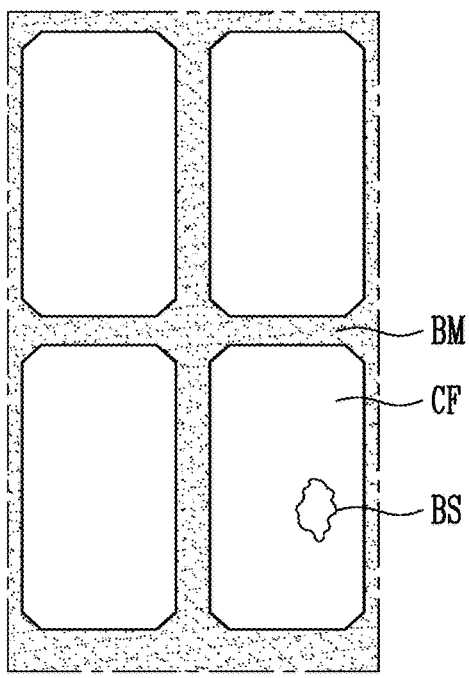
FIGS. 10A and 10B are plan views of a portion of the display panel, illustrating before and after carbonization or light-blocking processing is performed by the laser repair unit in accordance with an embodiment.
Figure 10B:
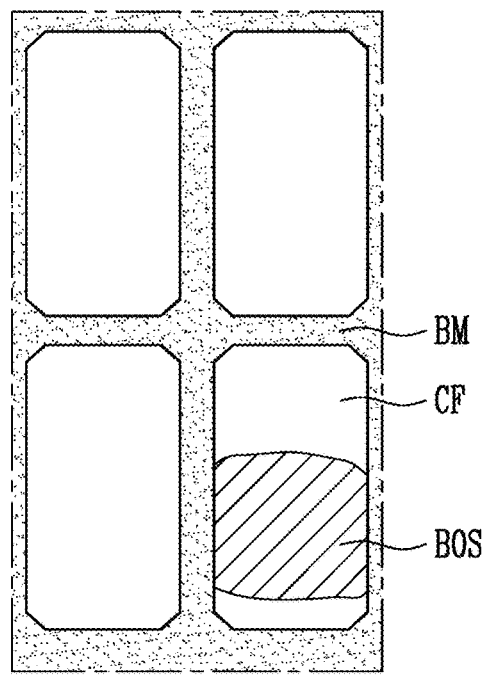

FIGS. 8A and 8B are layout views of a portion of a display panel, illustrating before and after a metal line is repaired by the laser repair unit in accordance with an embodiment. FIGS. 9A and 9B are layout views of a portion of the display panel, illustrating before and after a semiconductor pattern is repaired by the laser repair unit in accordance with an embodiment. FIGS. 10A and 10B are plan views of a portion of the display panel, illustrating before and after carbonization or light-blocking processing is performed by the laser repair unit in accordance with an embodiment.

Although not shown in the drawings, the laser repair unit 30 may be an apparatus for generating a laser beam, and the laser beam may be generated using various laser sources such as a nanosecond laser source, a picosecond laser source, and a femtosecond laser source. The laser repair unit 30 may irradiate the laser beam onto the display panel so as to repair the display panel.

Referring to FIGS. 8A and 8B, a gate line GL may be disposed in a lateral direction in a TFT circuit layer of the display panel, and a data line DL may be disposed in a longitudinal direction in the TFT circuit layer of the display panel. In addition, an insulating layer may be interposed between the gate line GL and the data line DL so as to prevent a short circuit between the gate line GL and the data line DL.

In a partial area of the display panel, when a failure of a pixel is caused due to the short circuit between the gate line GL and the data line DL or when an off-failure occurs without cause, the short-circuited portion is opened using a laser (see OP1), or a portion at which a first pixel electrode and the gate line GL overlap with each other is short-circuited using laser, so that a gate-off signal is transferred to the first pixel electrode, thereby repairing the off-failure. In order to prevent a data signal applied through the data line DL from being transferred to the gate line GL through the first pixel electrode in which the failure occurs, a source or drain electrode connected to the repaired first pixel electrode may be opened from the pixel electrode.

Referring to FIGS. 9A and 9B, in the manner described above, when a failure occurs in a semiconductor layer AL disposed in the TFT circuit layer of the display panel, the semiconductor layer AL may be opened to ensure proper repair of the display panel (see OP2).

Referring to FIGS. 10A and 10B, the laser repair unit 30 may perform carbonization processing or light-blocking processing.

The carbonization or light-blocking processing may be performed on a color filter CF or black matrix BM overlapping with a pixel. The color filter CF or black matrix BM may be made of an organic compound.

An inspection can be made to determine whether a foreign substance has penetrated after the color filter CF or black matrix BM is formed in the display panel.

First, the carbonization processing will be described. When a foreign substance BS in the color filter CF or the black matrix BM is checked, the carbonization processing may be performed by the laser repair unit 30.

The laser repair unit 30 is located on one area of the black matrix BM defining a unit pixel into which the foreign substance BS penetrates. Subsequently, the area is scanned by irradiating laser from the laser repair unit 30. The laser may be tuned to avoid irradiation of the area. The laser repair unit 30 may diffuse the black matrix BM by irradiating laser onto the black matrix BM.

The laser may be a solid state laser having a pulsed wave mode. The pulse width of the laser may be set to femtoseconds to nanoseconds. The pulse width of the laser may be in a range from femtoseconds to nanoseconds.

The light-blocking processing will be described. The laser repair unit 30 may blacken the color filter by using the laser. The color filter CF may be blackened by the carbon bonding of an organic material exhibiting a color of the color filter CF by the laser. Accordingly, the pixel into which the foreign substance BS penetrates can be completely light-blocked.

A method of repairing a display panel will be described in conjunction with FIGS. 11 and 12.

Figure 11:
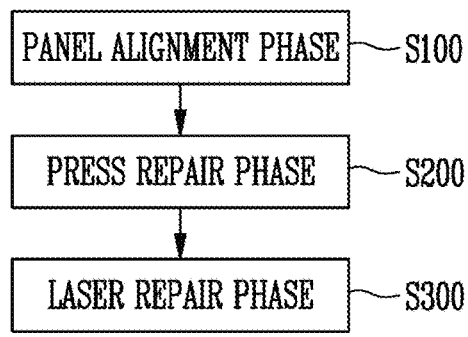
FIG. 11 is a flowchart for explaining a method of repairing a display panel, in accordance with an embodiment.

FIG. 11 is a flowchart for explaining a method of repairing a display panel, in accordance with an embodiment of the present disclosure. FIG. 12 is a flowchart for explaining detailed processes of a press repair phase shown in FIG. 11.

Referring to FIG. 11, the method of repairing a display panel, for example, using the panel repairing apparatus 1 of FIG. 1, includes a panel alignment phase (S100), a press repair phase (S200), and a laser repair phase (S300).

In this specification, although a case where the phases are sequentially performed according to the flowchart is described, some phases illustrated to be consecutively performed may be simultaneously performed, the sequence of the phases may be changed, some phases may be omitted, or another phase may be further included between the phases.

The panel alignment phase (S100), the press repair phase (S200), and the laser repair phase (S300) may be sequentially performed.

The panel alignment phase (S100) corresponds to a phase in which a display panel is accommodated in the panel loader 20 of the panel repairing apparatus 1, and the panel loader 20 moves the display panel.

In an embodiment, before the display panel is accommodated, the panel loader 20 may be placed at one side of the panel repairing apparatus 1 and accommodate the display panel input from one side of the panel loader 20. The panel loader 20 may move the position of the display panel so that the press repair unit 40 or the laser repair unit 30 can easily access the accommodated display panel for each defect position of the display panel.

The press repair phase (S200) corresponds to a phase in which the press repair unit 40 destroys or plastic-deforms the second column spacer 551 or the foreign substance by pressurizing the surface of the above-described display panel.

Figure 12:
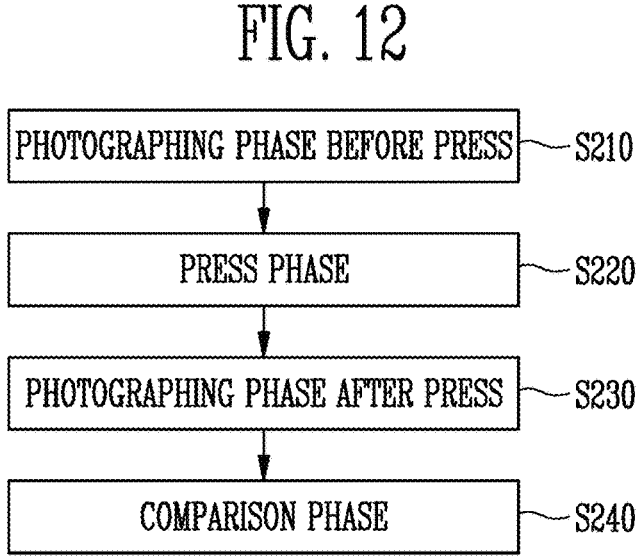
FIG. 12 is a flowchart for explaining detailed processes of a press repair phase shown in FIG. 11.

Referring to FIG. 12, the press repair phase (S200) may include a photographing phase (S210) before press, a press phase (S220), a photographing phase (S230) after press, and a comparison phase (S240).

The photographing phase (S210) before press corresponds to a phase in which a surface of the display panel, which corresponds to a defect position, is photographed through the repair determiner 420 of the press repair unit 40 before press repair progresses. The repair determiner 420 may photograph the surface of the display panel by moving freely to surroundings of the defect position, and generate reference data that can become a reference value after repair.

The press phase (S220) corresponds to a phase in which the pressurizer 410 of the press repair unit 40 pressurizes the surface of the display panel.

The photographing phase (S230) after press corresponds to a phase in which the surface of the display panel, which corresponds to the defect position, is photographed through the repair determiner 420 of the press repair unit 40 after the press repair progresses. After the press repair progresses, the repair determiner 420 may photograph the surface of the display panel by moving freely to the surroundings of the defect position, and generate repair data.

The comparison phase (S240) corresponds to a phase of comparing the reference data and the repair data. The repair determiner 420 may determine whether panel repair with respect to the corresponding position has succeeded, by comparing the reference data and the repair data.

The laser repair phase (S300) corresponds to a phase in which the laser repair unit 30 allows the gate line GL and the data line DL to be short-circuited or opened, allows the semiconductor layer AL to be short-circuited or opened, and performs at least one of carbonization processing and light-blocking processing.

Methods of repairing a display panel, using the panel repairing apparatus, in accordance with other embodiments will be described in conjunction with FIGS. 13 and 14. Hereinafter, components identical to those shown in FIGS. 1 to 12 are designated by like reference numerals.

FIGS. 13 and 14 are flowcharts for explaining methods of repairing a display panel in accordance with other embodiments.

Referring to FIG. 13, the laser repair phase (S300) may be first performed, and the press repair phase (S200) may be then performed.

Referring to FIG. 14, a phase (S400) of simultaneously performed press repair and laser repair may be included. In this embodiment, it will be understood that, in the phase (S400) of simultaneously performed the press repair and the laser repair, the press repair phase (S200) and the laser repair phase (S300), which are described above, are simultaneously performed.

FIG. 15 is a view illustrating a panel repairing apparatus in accordance with another embodiment.

Referring to FIG. 15, in the panel repairing apparatus 2, each of the laser repair unit 30 and the press repair unit 40 may be formed in a separate gantry structure. The gantry structure constituting each of the laser repair unit 30 and the press repair unit 40 may repair the display panel while independently moving.

In accordance with the disclosure, the panel repairing apparatus has a repair unit using application of laser and a repair unit using application of pressure on a display panel, so that the volume of the apparatus can be reduced.

Further, a display panel is repaired by simultaneously or separately performing a process using application of laser and a process using application of pressure on a display panel, so that time and cost can be saved.

Example embodiments have been disclosed herein, and although specific terms are employed, they are used and are to be interpreted in a generic and descriptive sense only and not to limit the scope of the invention. In some instances, as would be apparent to one of ordinary skill in the art that the features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A panel repairing apparatus comprising:
   a panel loader that accommodates a display panel;
   a laser repair unit that repairs the display panel by irradiating a laser onto the display panel; and
   a press repair unit that repairs the display panel by pressurizing the display panel.

2. The panel repairing apparatus of claim 1, wherein the press repair unit includes:
   a repair determiner that obtains images of a surface of the display panel to determine a repair status of the display panel; and
   a pressurizer that pressurizes the surface of the display panel.

3. The panel repairing apparatus of claim 2, wherein
   the pressurizer includes a pressurizing part having a cylindrical shape, and
   the pressurizing part includes a planar surface that pressurizes the display panel.

4. The panel repairing apparatus of claim 2, wherein the repair determiner includes a camera.

5. The panel repairing apparatus of claim 2, wherein the repair determiner automatically determines a visible failure of the display panel.

6. The panel repairing apparatus of claim 1, wherein the laser repair unit and the press repair unit include a moving member that is movable in X-axis, Y-axis, and Z-axis directions.

7. The panel repairing apparatus of claim 1, wherein the laser repair unit and the press repair unit are disposed in one gantry structure.

8. The panel repairing apparatus of claim 1, wherein the panel repairing apparatus has a width of about 3,500 mm or less, a length of about 5,400 mm or less, and a height of about 3,340 mm or less.

9. The panel repairing apparatus of claim 1, further comprising a controller that controls the panel loader, the laser repair unit, and the press repair unit.

10. The panel repairing apparatus of claim 9, wherein the controller collects defect position information of the display panel.

11. The panel repairing apparatus of claim 1, wherein the laser repair unit performs carbonization processing or light-blocking processing in the display panel.

12. The panel repairing apparatus of claim 10, wherein the panel loader moves a position of the display panel, and the press repair unit or the laser repair unit has access to a defect position of the display panel.

13. A method of repairing a display panel, the method comprising:
- accommodating the display panel in a panel loader;
- pressurizing a surface of the display panel; and
- irradiating a laser onto the display panel.

14. The method of repairing a display panel of claim 13, wherein the pressurizing the surface of the display panel and the irradiating the laser are performed at a same time.

15. The method of repairing a display panel of claim 13, wherein the display panel includes:
- at least two transparent insulating substrates facing each other; and
- column spacers disposed between the at least two transparent insulating substrates.

16. The method of repairing a display panel of claim 15, wherein the column spacers include a first column spacer and a second column spacer, which have different heights.

17. The method of repairing a display panel of claim 13, wherein the pressurizing the surface of the display panel includes maintaining the pressurizing of the surface of the display panel for a predetermined time.

18. The method of repairing a display panel of claim 13, further comprising obtaining images of the surface of the display panel before and after the pressurizing of the surface of the display panel.

19. The method of repairing a display panel of claim 18, wherein the obtaining images of the surface of the display panel includes photographing the surface of the display panel.

20. A panel repairing apparatus for repairing a display panel by pressurizing the display panel, the panel repairing apparatus comprising:
- a repair determiner that obtains images of a surface of the display panel to determine a repair status of the display panel; and
- a pressurizer that pressurizes the surface of the display panel.

* * * * *